(12) United States Patent
Mannak

(10) Patent No.: US 6,169,908 B1
(45) Date of Patent: Jan. 2, 2001

(54) TELECOMMUNICATION SYSTEM

(75) Inventor: Jacobine Johannette Mannak, The Hague (NL)

(73) Assignee: Koninklijke PTT Nederland N.V. (NL)

(*) Notice: Under 35 U.S.C. 154(b), the term of this patent shall be extended for 0 days.

(21) Appl. No.: 09/045,504

(22) Filed: Mar. 20, 1998

(30) Foreign Application Priority Data

Mar. 21, 1997 (NL) .................................... 1005601

(51) Int. Cl.[7] .............................. H04B 1/16; H04B 1/38; H04Q 7/20; H04Q 5/22; H04M 1/00

(52) U.S. Cl. ................. 455/557; 455/557; 455/575; 455/343; 455/426; 340/825.44

(58) Field of Search ................. 455/31.3, 38.1, 455/66, 550, 556, 557, 575, 426, 343, 458; 340/825.44

(56) References Cited

U.S. PATENT DOCUMENTS

| 5,511,111 | 4/1996 | Serbetcioglu et al. |
|---|---|---|
| 5,828,949 | * 11/1998 | Silver et al. .................. 455/38.3 |
| 5,898,758 | * 5/1999 | Rosenberg .................... 379/57 |

FOREIGN PATENT DOCUMENTS

| 0 319 210 | 6/1989 | (EP) . | |
|---|---|---|---|
| 0 514 360 A2 | * 4/1992 | (EP) | ...................... H04Q 7/04 |
| 0 503 813 | 9/1992 | (EP) . | |
| 0 514 360 | 11/1992 | (EP) . | |
| 08168080 | 6/1996 | (JP) . | |

* cited by examiner

*Primary Examiner*—Daniel S. Hunter
*Assistant Examiner*—Meless Zewdu
(74) *Attorney, Agent, or Firm*—Michaelson & Wallace; Peter L. Michaelson

(57) ABSTRACT

A telecommunication system comprising a telecommunication network apparatus and at least one terminal. The terminal comprises a radiotelephone section and a pager section. The radiotelephone section and the pager section can be uncoupled from and coupled to each other. The telecommunication network apparatus comprises paging means for transmitting, to the pager section, calls from callers who form part of a preferred group if the pager section is uncoupled from the radiotelephone section. The terminal is provided with coupling detection means for detecting whether the pager section is uncoupled from the radiotelephone section and, if so, for transmitting an indication signal hereof to the paging means.

9 Claims, 5 Drawing Sheets

TELECOMMUNICATION SYSTEM

BACKGROUND OF THE INVENTION

Figure 1:
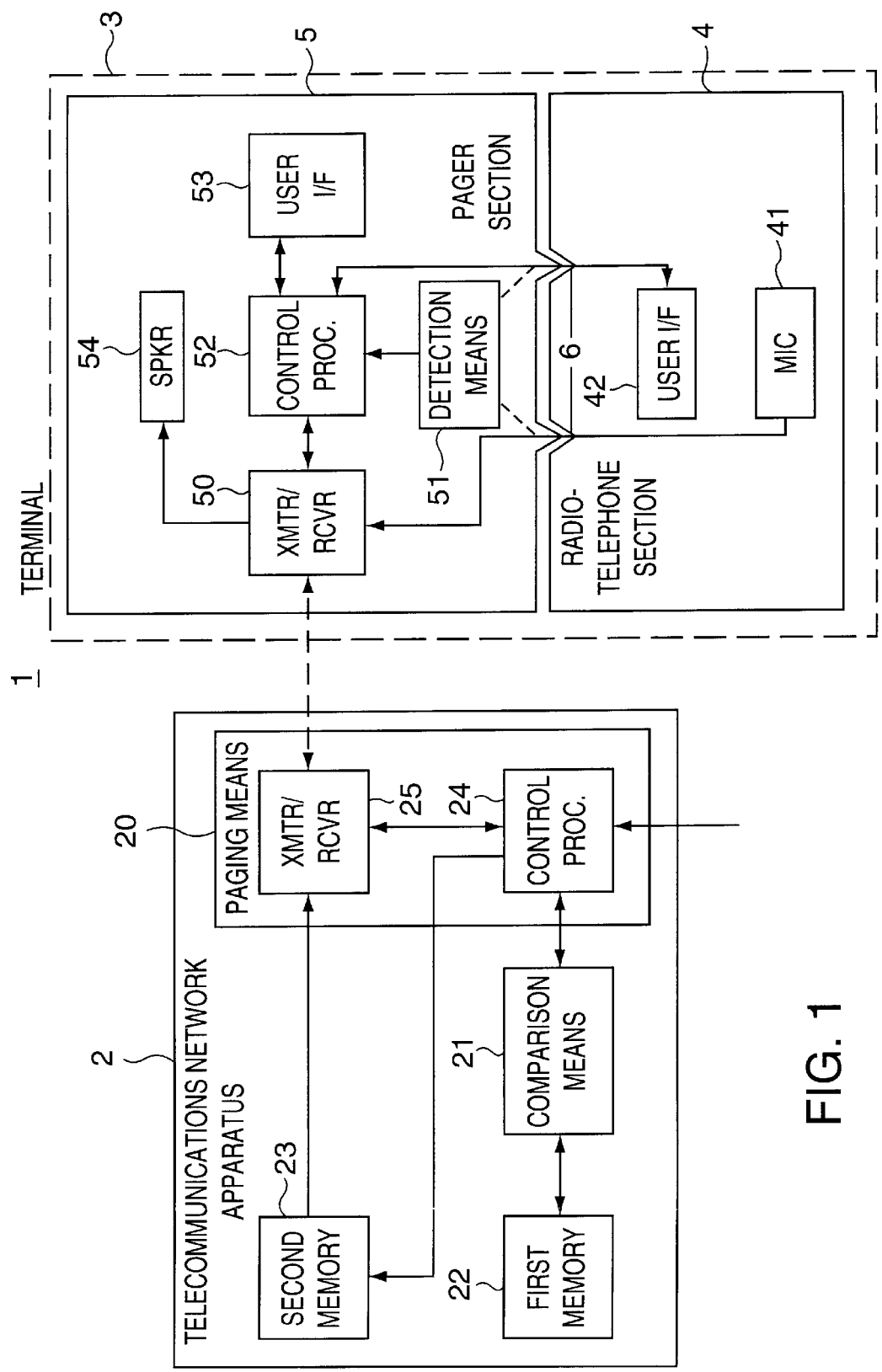

The invention is related to a telecommunication system comprising a telecommunication network and a terminal, said terminal comprising a radiotelephone section and a pager section, the pager section being detachable from the radiotelephone section.

A terminal for use in such a telecommunication system is described in "Patent Abstracts of Japan, Publication number: 08168080 A". In this document, a terminal is described in which the pager section is carried separately from the radiotelephone section by a user. As soon as a call comes in, the user couples the pager section to the radiotelephone section and is hereby enabled to speak with the caller.

SUMMARY OF THE INVENTION

It is an aim of the invention to provide a telecommunication system, in which the coupling and uncoupling of the radiotelephone section and the pager section of the terminal has a different function than in the prior art telecommunication system.

The telecommunication system according to the invention is thereto characterised in that the telecommunication network comprises paging means for transmitting to the pager section calls from callers who form part of a preferred group if the pager section of the radiotelephone section is uncoupled, and that the terminal is provided with coupling detection means for detecting whether the pager section of the radiotelephone section is uncoupled and, if this is the case, for transmitting an indication signal hereof to the paging means. After receipt of the indication signal, the paging means are informed that the pager section and the radiotelephone section are uncoupled. As of that moment, only those calls are transmitted to the pager section which originate from callers from the preferred group. These calls can comprise a short message which indicates the reason for the call. The preferred group can be set by the user. Dependent upon the preference of the user, this preferred group can consist, for example, of relatives, friends or colleagues. Calls originating from callers who do not belong to the preferred group are not transmitted to the pager section. The pager section can be uncoupled from the radiotelephone section in situations, such as going out or visiting customers, in which the user does not want to take the whole terminal with him because conducting complete telephone calls in such situations is inconvenient or inappropriate. By only taking the pager section with him, the user is still reachable for the preferred group. Uncoupling the pager section and the radiotelephone section is a very easy and intuitive way of setting up said selective reachability.

A first form of embodiment of the telecommunication system according to the invention is characterised in that the telecommunication network is provided with message storage means for storing the messages of callers who do not form part of the preferred group if the pager section of the radiotelephone section is uncoupled. Later, when the pager section and the radiotelephone section are again coupled to each other, these messages can be listened to by the user of the terminal. The callers who do not belong to the preferred group are thus not switched through to the pager section, so that the user of the terminal can not be disturbed by them if the pager section of the radiotelephone section is uncoupled.

A second form of embodiment of the telecommunication system according to the invention is characterised in that the paging means are arranged for transmitting the calls via a radio channel for mobile telecommunication. The pager section must thus be provided with a receiver for mobile communication in order to be able to receive the calls. As soon as the pager section and the radiotelephone section are coupled to each other, this receiver can also be used for processing the calls conducted with the radiotelephone section via the mobile radio channel. In this way the receiver is used for two purposes, which is efficient.

A third form of embodiment of the telecommunication system according to the invention is characterised in that the paging means are arranged for transmitting the calls via a radio channel for paging. The pager section must therefore be provided with a paging receiver in order to be able to receive the calls. The use of a radio channel for paging has the advantage that the pager section uses little energy. The reason for this is that in paging systems, as opposed to in mobile telephone systems, there is only traffic from the network to the terminal, and not the other way around. This has as a result that, in a paging system, the terminal does not lose any energy in transmitting messages to the network. In mobile telecommunication systems, the terminal must periodically transmit registration messages to the network.

A fourth form of embodiment of the telecommunication system according to the invention is characterised in that the telecommunication network comprises storage means for storing telephone numbers of callers who form part of the preferred group, and comparison means for comparing the telephone number of a caller with the stored telephone numbers, in which the comparison means are arranged for emitting a confirmation signal to the paging means if the telephone numbers correspond. In this way it can, in a simple manner, already be determined in the telecommunication network whether a caller belongs to the preferred group and whether a call must be transmitted to the pager section.

A fifth form of embodiment of the telecommunication system according to the invention is characterised in that the terminal comprises storage means for storing telephone numbers of callers who form part of the preferred group, and comparison means for comparing the telephone number of a caller with the stored telephone numbers, in which the comparison means are arranged for emitting a confirmation signal to the paging means if the telephone numbers correspond. As Gil soon as a caller attempts to reach the terminal, the telephone number of the caller is passed on to the terminal. If the caller belongs to the preferred group, a confirmation signal is sent back from the terminal to the paging means, which subsequently transmits a call from the caller to the pager section. If the caller does not belong to the preferred group, the terminal transmits a message to this extent back to the paging means. These, of course, do not then transmit a call to the pager section, so that the user is not disturbed.

A sixth form of embodiment of the telecommunication system according to the invention is characterised in that the telecommunication network comprises storage means for storing a code, and comparison means for comparing a code, entered by a caller, with the stored code, in which the comparison means are arranged for emitting a confirmation signal to the paging means if the codes correspond. The caller distributes the code over a preferred group, such as friends, relatives or business relations. If someone from this group calls and the pager section and the radiotelephone section are disconnected from each other, the caller is requested to enter a code. If the code is correct, a call is transmitted to the pager section.

A seventh form of embodiment of the telecommunication system according to the invention is characterised in that the terminal comprises storage means for storing a code, and comparison means for comparing a code, entered by a caller, with the stored code, in which the comparison means are arranged for emitting a confirmation signal to the paging means if the codes correspond.

The invention is further related to a terminal for use in a telecommunication system which comprises a telecommunication network and at least one terminal, the terminal comprising a radiotelephone section and a pager section, in which the pager section of the radiotelephone section is detachable, characterised in that the terminal is provided with coupling detection means for detecting whether the pager section of the radiotelephone section is uncoupled and, if this is the case, for transmitting an indication signal hereof to the telecommunication network.

Finally, the invention is related to a telecommunication network for use in a telecommunication system, which comprises a telecommunication network and at least one terminal, the terminal comprising a radiotelephone section and a pager section, in which the pager section of the radiotelephone section is detachable, characterised in that the telecommunication network comprises paging means for transmitting calls from callers, who form part of a preferred group, to the pager section, if the pager section of the radiotelephone section is uncoupled.

REFERENCE

"Patent Abstracts of Japan, Publication number 08168080 A".

This reference is deemed to be incorporated in this application. dr

FORMS OF EMBODIMENT

Figure 2:
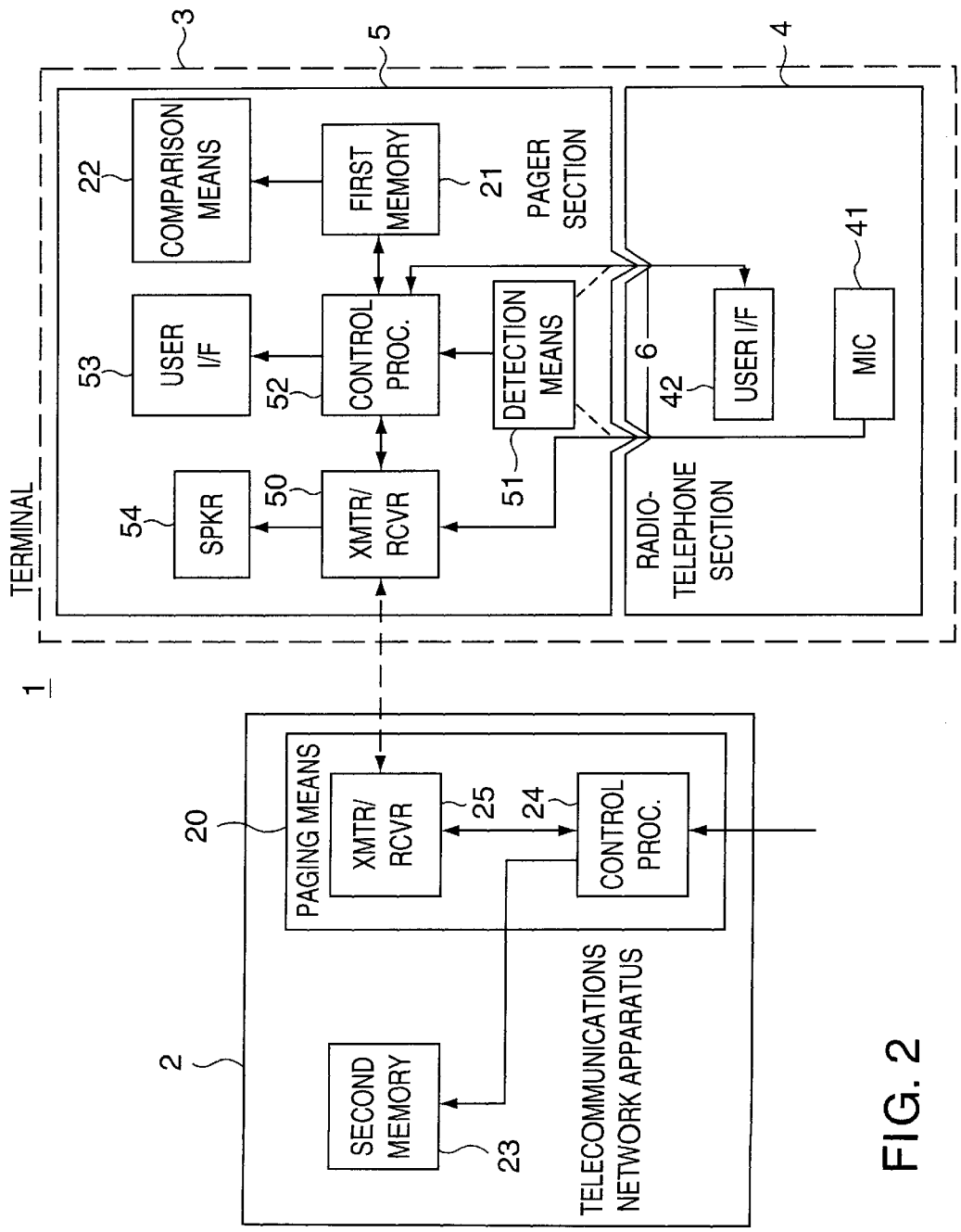
Figure 3:
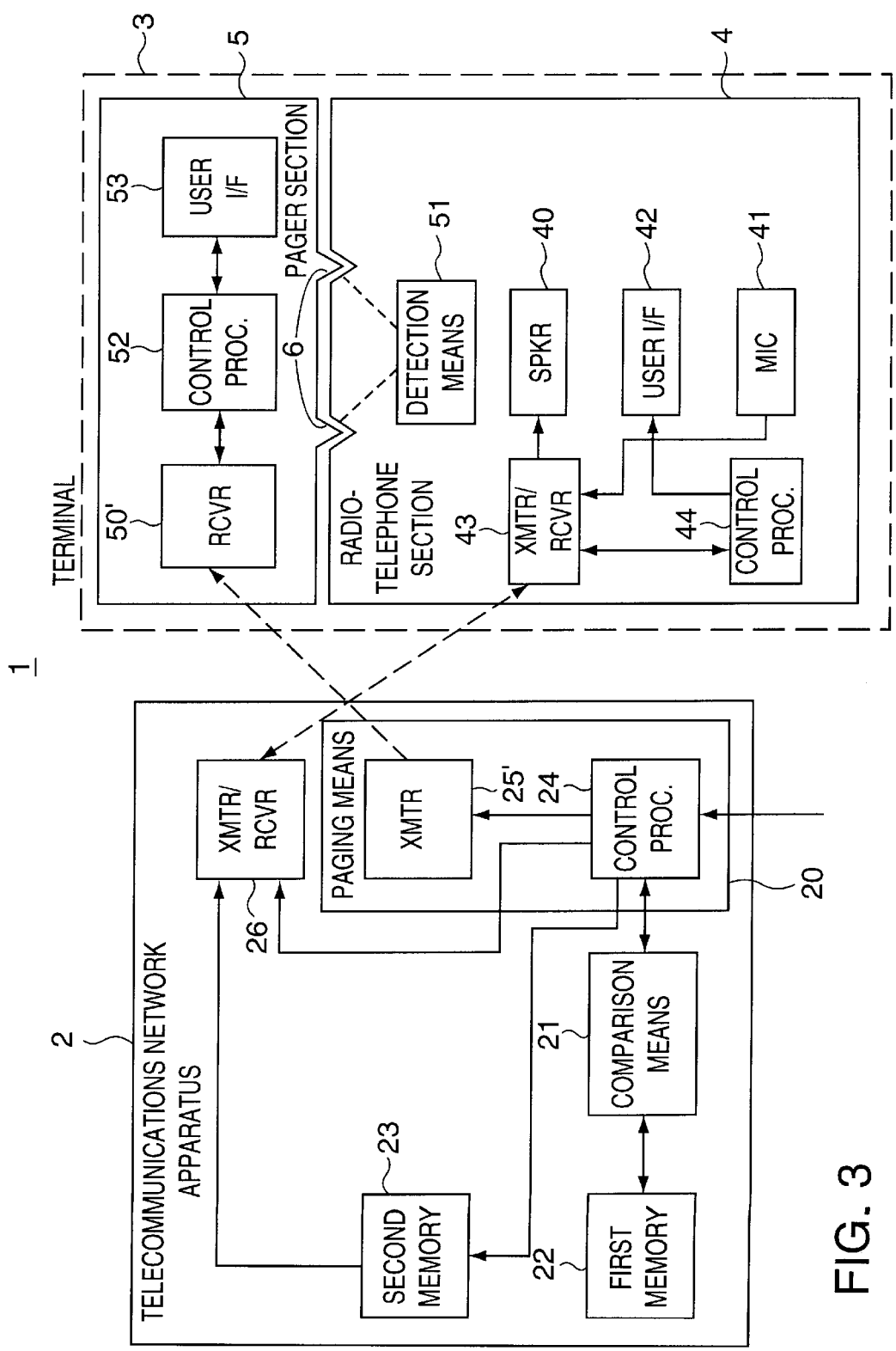
Figure 4A:
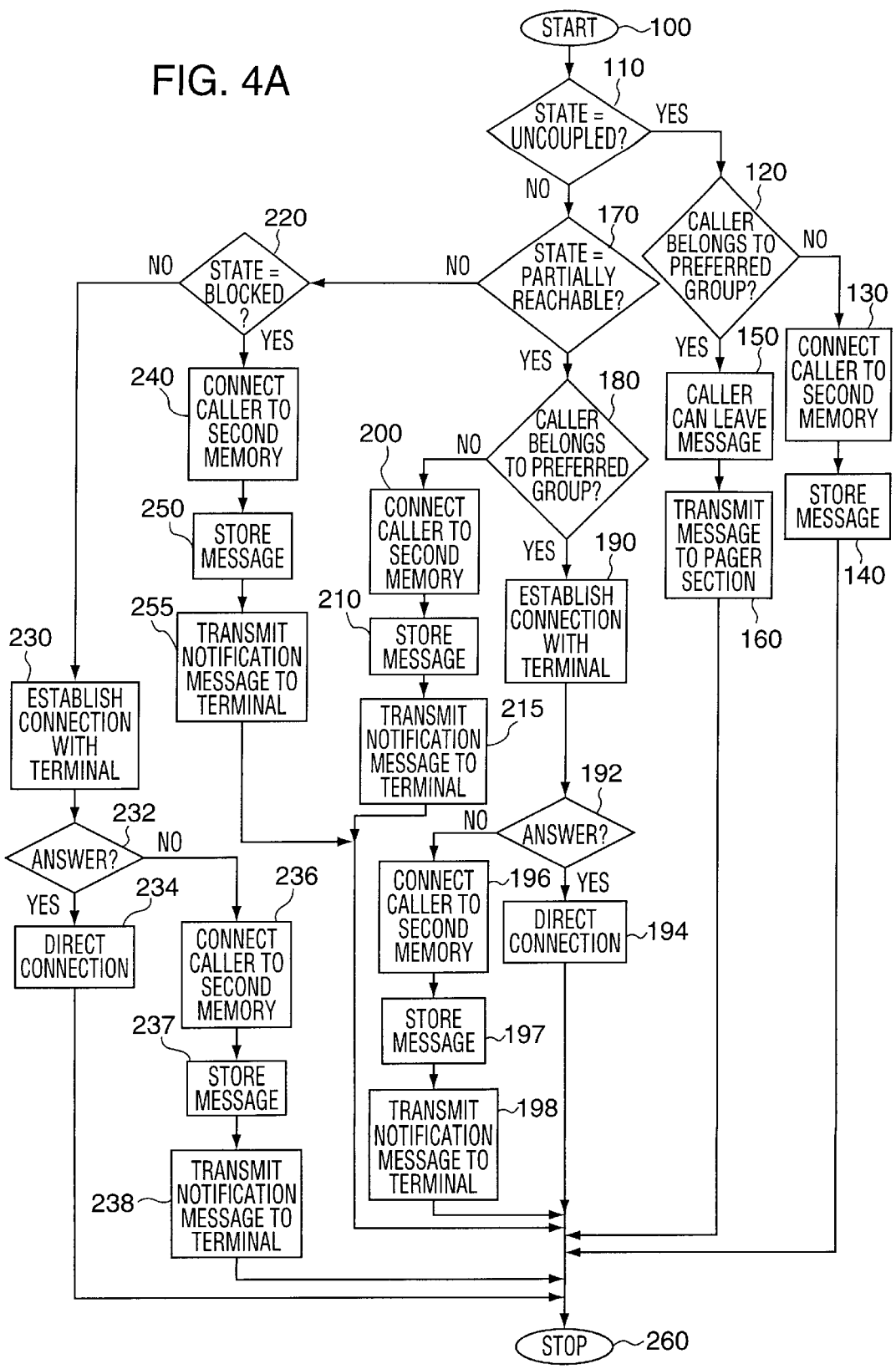
Figure 4B:
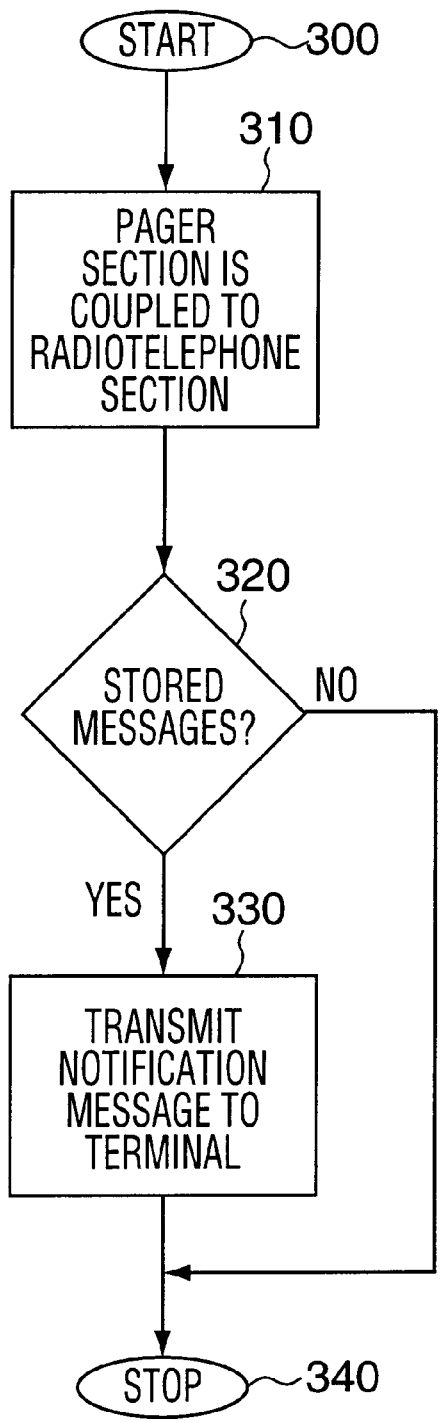

The invention will be further explained by reference to the forms of embodiment shown in the figures. In this connection:

FIG. 1 diagrammatically shows a first form of embodiment of the telecommunication system according to the invention, FIG. 2 diagrammatically shows a second form of embodiment of the telecommunication system according to the invention, FIG. 3 diagrammatically shows a third form of embodiment of the telecommunication system according to the invention, FIG. 4A shows a flowchart of the operation of the telecommunication system according to the invention, and FIG. 4B shows a flowchart of the operation at the moment the pager section and the radiotelephone section are again attached to each other.

FIG. 1 shows a first form of embodiment of a telecommunication system 1, comprising a telecommunication network 2 and a terminal 3. For the sake of clarity in the figure, only one terminal 3 is shown, but, of course, the telecommunication system 1 can comprise a large number of terminals 3. The terminal 3 shown consists of a radiotelephone section 4 and a pager section 5. Both said sections can be coupled to each other and uncoupled from each other by means of a mechanical coupling 6. Said mechanical coupling can be of an arbitrary suitable type. The pager section 5 is suitable for receiving calls. If the pager section 5 and the radiotelephone section 4 are coupled to each other, normal telephone calls can be conducted with said terminal 3. The telecommunication network 2 comprises paging means 20, comparison means 21, a first memory 22 and a second memory 23 for storing messages. The paging means 20 consist of a control processor 24 and a transmitter/receiver 25. The transmitter/receiver 25 operates according to a standard for mobile telephony, for example GSM. The telecommunication network 2 is of the type in which, in the event of a call, the number of the caller is jointly transmitted (CLI=Caller Line Identification). The radiotelephone section 4 of said terminal 3 comprises a microphone 41 and a user interface 42. Said user interface 42 consists at least of a telephone keypad and can optionally also comprise a display. The pager section 5 comprises a transmitter/receiver 50, detection means 51, a control processor 52, a user interface 53 and a loudspeaker 54. The user interface 53 consists of a display for showing received messages and optionally a keypad. The detection means 51 detect whether the pager section 5 and the radiotelephone section 4 are uncoupled or coupled. The transmitter/receiver 50 operates according to a standard for mobile telephony, for example GSM.

The telecommunication system 1 shown in FIG. 1 operates as follows: As soon as the user uncouples the radiotelephone section 4 and the pager section 5 from each other, this is detected by the detection means 51. Via the control processor 52 and the transmitter/receiver 50, the detection means 51 transmit an indication signal, indicating that the pager section 5 and the radiotelephone section 4 are uncoupled from each other, to the telecommunication network 2. This signal is received by the transmitter/receiver 25 and passed on to the control processor 24 for processing. If an indication signal of the detection means 51 is received, the control processor 24 issues the state "uncoupled" to the terminal 3. In the state "uncoupled", callers from a preferred group can transmit a call to the user of said terminal 3. The comparison means 21 determine whether a caller who attempts to contact said terminal 3 belongs to the preferred group by comparing the telephone number of the caller with the telephone numbers of the preferred group stored in the first memory 22, or by comparing a secret code entered by the caller with a code stored in the first memory 22. If the caller belongs to the preferred group, a call is sent by the paging means 25 to the pager section 5. This call optionally comprises a short message from the caller which can be shown via the display which is present on the pager section 5. Other callers are given the opportunity to leave a message, which is stored in said second memory 23. The message can be in the form of voice (voice mail) or text. The user is notified of the existence of the message as soon as he reconnects the pager section 5 and the radiotelephone section 4 to each other. He can then listen to the message or read it out.

As soon as the pager section 5 and the radiotelephone section 4 are coupled to each other again by the user, the detection means pass an indication signal for this situation on to the control processor 24. The control processor 24 then issues the state "coupled" to said terminal 3. Within said state "attached", three sub-states can be set by the user. These are:

Fully reachable: the user can be reached directly by callers from the preferred group as well as by other callers;

Partially reachable: the user is only directly reachable for callers from the preferred group; other callers are given the opportunity of leaving a message, which is stored in said second memory 23. The message can be in the form of voice (voice mail) or text.

Blocked: the user is not directly reachable for any caller at all. Both the callers from the preferred group and the other callers are given the opportunity of leaving a message, which is stored in said second memory 23. The message can be in the form of voice (voice mail) or text.

The caller can set all said sub-states via the user interface 42 which is present in the radiotelephone section 4.

By means of the loudspeaker 54 which is present in the pager section 5, and the microphone 41 which is present in the radiotelephone section 4, the user is able to conduct telephone calls during the state "coupled". The radiotelephone section 4 itself is not provided with a transmitter/receiver and a control processor. Said two components are located in the pager section and, if the pager section 5 and the radiotelephone section 4 are coupled to each other, are also used by the radiotelephone section 4. In this way it is not necessary to provide said terminal 3 with two control processors and transmitter/receivers. To this end, the mechanical coupling 6 must also result in electrical contact between the radiotelephone section 4 and the pager section 5. The transmitter/receiver 25, present in the telecommunication network 2, is also suitable for transmitting and receiving the signals associated with telephone calls conducted with terminal 3.

By means of the user interface 42, the user can also set the telephone numbers which are to be incorporated in the preferred group. These telephone numbers are transmitted to the telecommunication network 2 and stored in storage means 22. An alternative solution is storing a secret code in said storage means 22. The user of said terminal 3 passes this secret code on to the callers from his preferred group. These callers must then indicate, by entering the secret code, that they belong to the preferred group.

Said control processor 24 is loaded with software for executing the steps of the flow charts shown in the FIG. 4A and FIG. 4B. The steps shown in FIG. 4A have the following meaning:

| STEP | MEANING |
| --- | --- |
| 100 | START |
| 110 | STATE IS "UNCOUPLED"? |
| 120 | CALLER BELONGS TO PREFERRED GROUP? |
| 130 | CONNECT CALLER TO SECOND MEMORY |
| 140 | STORE MESSAGE |
| 150 | CALLER CAN LEAVE MESSAGE |
| 160 | TRANSMIT MESSAGE TO PAGER SECTION |
| 170 | STATE IS "PARTIALLY REACHABLE"? |
| 180 | CALLER BELONGS TO PREFERRED GROUP? |
| 190 | ESTABLISH CONNECTION WITH TERMINAL |
| 192 | ANSWER? |
| 194 | DIRECT CONNECTION |
| 196 | CONNECT CALLER TO SECOND MEMORY |
| 197 | STORE MESSAGE |
| 198 | TRANSMIT NOTIFICATION MESSAGE TO TERMINAL |
| 200 | CONNECT CALLER TO SECOND MEMORY |
| 210 | STORE MESSAGE |
| 215 | TRANSMIT NOTIFICATION MESSAGE TO TERMINAL |
| 220 | STATE IS "BLOCKED"? |
| 230 | ESTABLISH CONNECTION WITH TERMINAL |
| 232 | ANSWER? |
| 234 | DIRECT CONNECTION |
| 236 | CONNECT CALLER TO SECOND MEMORY |
| 237 | STORE MESSAGE |
| 238 | TRANSMIT NOTIFICATION MESSAGE TO TERMINAL |
| 240 | CONNECT CALLER TO SECOND MEMORY |
| 250 | STORE MESSAGE |
| 255 | TRANSMIT NOTIFICATION MESSAGE TO TERMINAL |
| 260 | STOP |

If someone calls terminal 3, it is first determined in step 110 whether the state of terminal 3 is "coupled" of "uncoupled". If the state is "uncoupled", it is determined in step 120 whether the caller belongs to the preferred group. This can be done by the comparison means 21 comparing the telephone number of the caller with the telephone numbers stored by the storage means 22, or by said comparison means comparing a secret code, entered by the caller, with a stored code. If the caller does not belong to the preferred group, the caller is switched through, in step 130, with the second memory 23 and is requested, for example by means of a voice message, to record (voice mail) or type a message. In step 140, this message is stored. As soon as the state of terminal 3 is "coupled" again, a notification message is sent to terminal 3 indicating that there is a message for the user. This is shown in FIG. 4B. The steps shown herein have the following meaning:

| | |
| --- | --- |
| 300 | START |
| 310 | PAGER SECTION IS COUPLED TO RADIOTELEPHONE SECTION |
| 320 | STORED MESSAGES? |
| 330 | TRANSMIT NOTIFICATION MESSAGE TO TERMINAL |
| 340 | STOP |

As soon as the pager section 5 is recoupled to the radiotelephone section 5, the detection means 51 transmit a message to this extent to the control processor 24 (step 310). It is subsequently determined whether, during the state "uncoupled", messages for the user were left by callers not belonging to the preferred group (step 320). If this is the case, a notification message is transmitted to said terminal 3 (step 330). The use can then listen to or read out the message in the way known per se.

If the caller does belong to the preferred group, the caller is requested in step 150, for example again by means of a voice message, to leave a message. In step 160, this message is transmitted to the pager section 5. Said pager section 5 comprises a loudspeaker 54 suitable for reproducing a ringing or beeping sound to draw the attention of the user to the message which has arrived, and a display for displaying this message. If the state of terminal 3 is "coupled", it is determined in step 170 whether the state is "partially reachable". If this is so, it is determined in step 180 whether the caller belongs to the preferred group. If the caller belongs to the preferred group, a direct telephone connection with terminal 3 is established in step 190. In step 192 it is determined whether the user of said terminal 3 answers within a certain period. If this is so, there is a direct connection between the caller and said terminal 3 (step 194). If the user does not answer, the caller is switched through, in step 196, to the second memory 23 and is requested to record or type a message. In step 197, this message is stored. In step 198 a notification message is sent to terminal 3, indicating that there is a message. If the caller does not belong to the preferred group, the caller is switched through, in step 200, to the second memory 23 and is requested to record or type a message. In step 210, this message is stored. In step 215, a notification message is sent to terminal 3, indicating that there is a message. The user can listen to or read out this message in the way known per se. If the state of terminal 3 is not "partially reachable", it is determined, in step 220, whether the state is "blocked". If this is not the case, the state of terminal 3 is "fully reachable". In this case, in step 230, regardless of whether the caller belongs to the preferred group or not, a direct connection with terminal 3 is established. In step 232 it is determined whether the user of said terminal 3 answers within a certain period. If this is so, a direct connection is established between the caller and said terminal 3 (step 234). If the user does not answer, the caller, in step 236, is switched through to the second memory 23 and is requested to record or type a message. In step 237, this message is stored. In step 238, a notification message is sent to terminal 3 indicating that there is a message. If the state is indeed "blocked", the caller, regardless of whether he or she belongs to the preferred group, is switched through, in step 240, to said second 29 memory 23 and is requested to record or type a message. In step 250, this message is stored. In step 255, a notification message is sent to terminal 3, indicating that there is a message. The notification message indicating that there is message, is preferably sent in the way this is done in already existing GSM systems. The message, which is passed on to the pager section 5 if the state is "uncoupled" and the caller belongs to the preferred group, is, for example, sent in the same way as SMS (Short Message Service) messages in already existing GSM systems.

In FIG. 2, a second form of embodiment of the telecommunication system 1 is shown. In this form of embodiment, the first memory 21 and the comparison means 22 are not accommodated in the telecommunication network 2 but in the pager section 5 of the terminal 3. As soon as a caller attempts to reach terminal 3 in the state "uncoupled", the telephone number of the caller is first sent to said terminal 3 by the paging means 20. This telephone number is compared by the comparison means 21 with the telephone numbers stored in said first memory 22. If the telephone number of the caller is the same as one of the stored telephone numbers and the caller therefore belongs to the preferred group, or if the secret code entered by the caller corresponds to the stored code, the comparison means 21, via control processor 52 and transmitter/receiver 50, transmit a confirmation signal to the paging means 20 of the terminal, said paging means subsequently transmitting a call from the caller to the pager section 5. If the caller does not belong to the preferred group, the comparison means 21 transmit a message to this extent back to the paging means 20. These, of course, do not then transmit a call to the pager section 5, so that the user is not disturbed. During the state "coupled", combined with the sub-status "partially reachable", a similar procedure is performed.

In FIG. 3, a third form of embodiment of the telecommunication system 1 according to the invention is shown. In this form of embodiment, the telecommunication network 2 comprises a transmitter 25' suitable for transmitting calls according to a paging standard, and a transmitter/receiver 26 which operates according to a standard for mobile telephony. The pager section 5 comprises a receiver 50' for receiving paging calls. The radiotelephone section 4 comprises a loudspeaker 40, a transmitter/receiver 43 suitable for a mobile telephony standard, and a control processor 44. The detection means 51 are also located in the radiotelephone section 4.

In the state "uncoupled", the calls originating from callers of the preferred group are transmitted by said transmitter 25' to the pager section 5, which receives the calls by means of receiver 50'. During the state "coupled", telephone conversations can be conducted with said radiotelephone section 4. To this end, use is made of transmitter/receiver 43 and transmitter/receiver 26 which operate according to a standard for mobile telephony. The detection means 51 transmit the indication messages of the state of said terminal 3 to the telecommunication network 2 by means of transmitter/receiver 43.

The telecommunication system 1 according to this form of embodiment has the advantage that the pager section 5 uses very little energy during the state "uncoupled". The reason for this is that, in paging systems, messages are sent only from the network to the terminal, and not vice versa. In this form of embodiment, the pager section 5 therefore does not lose any energy in transmitting registration messages, as is the case in the two forms of embodiment in which the pager section operates according to a standard for mobile telephony as shown in FIG. 1 and 2.

In the first and the second form of embodiment as shown in FIG. 1 and FIG. 2, the radiotelephone section 4 has been kept as simple as possible, all logic, including the so-called "SIM" card, if the terminal operates according to the GSM standard, being located in the pager section 5. In the third form of embodiment, as shown in FIG. 3, both the radiotelephone section 4 and the pager section 5 contain the logic required for the functioning of these respective parts.

It will be clear to those skilled in the art that the invention is not restricted to the forms of embodiment shown, and that many modifications and extensions are possible without departing from the scope of the invention. The telecommunication system can, for example, be suitable for operation according to a mobile telecommunication standard other than GSM.

What is claimed is:

1. A telecommunications systems for establishing selective reachability between a user and a preferred group of callers, comprising:

a telecommunications device to be used in a telecommunications network and a terminal, said terminal comprising a radiotelephone section and a pager section, wherein the pager section can be uncoupled from the radiotelephone section;

said telecommunications device comprising paging means for only transmitting calls from callers, who form part of the preferred group of callers, to the pager section if the pager section is uncoupled from the radiotelephone section;

wherein said terminal further comprises coupling detection means for detecting whether the pager section is uncoupled from the radiotelephone section and, in response thereto, for transmitting an indication signal thereof to the paging means; and wherein the telecommunications device further comprises message storage means for storing messages from callers who do not form part of the preferred group of callers if the pager section is uncoupled from the radiotelephone section.

2. The telecommunications system recited in claim 1 wherein the paging means are arranged for transmitting said calls via a radio channel used for mobile telecommunications.

3. The telecommunications system recited in claim 1 wherein the paging means are arranged for transmitting said calls via a radio channel used for paging.

4. The telecommunications system recited in claim 1 wherein the telecommunications device further comprises:

storage means for storing telephone numbers of callers who form part of the preferred group of callers so as to define stored telephone numbers; and comparison means for comparing a telephone number of a caller with the stored telephone numbers and emitting a confirmation signal to the paging means if the telephone number of the caller matches any of the stored telephone numbers.

5. The telecommunications system recited in claim 1 wherein the terminal further comprises:

storage means for storing telephone numbers of callers who form part of the preferred group of callers so as to define stored telephone numbers; and comparison means for comparing a telephone number of a caller with the stored telephone numbers and emitting a confirmation signal to the paging means if the telephone number of the caller matches any of the stored telephone numbers.

6. The telecommunications system recited in claim 1 wherein the telecommunications device further comprises:

storage means for storing a code so as to define a stored code; and comparison means for comparing a code entered by a caller with the stored code and emitting a confirmation signal to the paging means if the code entered by the caller matches the stored code.

7. The telecommunications system recited in claim 1 wherein the terminal further comprises:

storage means for storing a code so as to define a stored code; and comparison means for comparing a code entered by a caller with the stored code and emitting a confirmation signal to the paging means if the code entered by the caller matches the stored code.

8. A terminal for use in a telecommunications system for establishing selective reachability between a user and a preferred group of callers, the system comprising a telecommunications device to be used in a telecommunications network and at least one terminal, the terminal comprising:

a radiotelephone section;

a pager section, wherein the pager section can be uncoupled from the radiotelephone section; and coupling detection means for detecting whether the pager section is uncoupled from the radiotelephone section and, in response thereto, transmitting an indication signal thereof to the telecommunications device.

9. A telecommunications device for use in a telecommunications network, for use in a telecommunications system, for establishing selective reachability between a user and a preferred group of callers, the system comprising the telecommunications device and at least one terminal, the terminal comprising:

a radiotelephone section;

a pager section, wherein the pager section can be uncoupled from the radiotelephone section; and wherein the telecommunications device comprises paging means for only transmitting calls to the pager section from callers who form part of the preferred group of callers if the pager section is uncoupled from the radiotelephone section.

* * * * *

UNITED STATES PATENT AND TRADEMARK OFFICE
CERTIFICATE OF CORRECTION

PATENT NO : 6,169,908
DATED : January 2, 2001
INVENTOR(S) : Jacobine J. MANNAK

It is certified that error appears in the above-identified patent and that said Letters Patent are hereby corrected as shown below:

Page 1, section 54      Change title from "TELECOMMUNICATION SYSTEM" to --TELECOMMUNICATION TERMINAL HAVING SEPARATE, THROUGH COUPLABLE AND DETACHABLE, PAGING AND RADIOTELEPHONE SECTIONS, AND A TELECOMMUNICATION SYSTEM EMPLOYING SUCH A TERMINAL--.

Signed and Sealed this

Fifteenth Day of May, 2001

Attest:

NICHOLAS P. GODICI

Attesting Officer      Acting Director of the United States Patent and Trademark Office